US010523519B2

(12) United States Patent
Srinivasan et al.

(10) Patent No.: US 10,523,519 B2
(45) Date of Patent: Dec. 31, 2019

(54) COMPARATIVE MULTI-FORECASTING ANALYTICS SERVICE STACK FOR CLOUD COMPUTING RESOURCE ALLOCATION

(71) Applicant: Accenture Global Solutions Limited, Dublin (IE)

(72) Inventors: Madhan Kumar Srinivasan, Karnataka (IN); Guruprasad Pv, Karnataka (IN)

(73) Assignee: Accenture Global Solutions Limited, Dublin (IE)

( * ) Notice: Subject to any disclaimer, the term of this patent is extended or adjusted under 35 U.S.C. 154(b) by 76 days.

(21) Appl. No.: 15/637,953

(22) Filed: Jun. 29, 2017

(65) Prior Publication Data
US 2018/0302291 A1    Oct. 18, 2018

(30) Foreign Application Priority Data
Apr. 14, 2017  (IN) .............................. 201741013376

(51) Int. Cl.
*H04L 12/24* (2006.01)
*G06F 9/50* (2006.01)
*G06F 9/455* (2018.01)
*H04L 29/08* (2006.01)

(52) U.S. Cl.
CPC .......... *H04L 41/14* (2013.01); *G06F 9/45558* (2013.01); *G06F 9/5016* (2013.01); *G06F 9/5027* (2013.01); *G06F 2009/45595* (2013.01); *H04L 67/10* (2013.01)

(58) Field of Classification Search
CPC ...................................................... H04L 41/14
USPC .......................................................... 709/224
See application file for complete search history.

(56) References Cited

U.S. PATENT DOCUMENTS

| 8,499,066 B1 | 7/2013 | Zhang et al. |
| 2011/0302578 A1 | 12/2011 | Isci et al. |
| 2014/0019961 A1 | 1/2014 | Neuse et al. |
| 2014/0280918 A1* | 9/2014 | Grandhe ............ G06Q 30/0631 709/224 |
| 2015/0288573 A1 | 10/2015 | Baughman et al. |
| 2016/0323158 A1* | 11/2016 | Hu ........................ G06N 7/005 |
| 2018/0046926 A1* | 2/2018 | Achin ................... G06Q 10/06 |

OTHER PUBLICATIONS

European Patent Office, Extended European Search Report and Written Opinion from European Patent Application No. 17179012.4 dated Feb. 16, 2018, pp. 1-10.
(Continued)

*Primary Examiner* — David R Lazaro
*Assistant Examiner* — Zia Khurshid
(74) *Attorney, Agent, or Firm* — Brinks Gilson & Lione

(57) ABSTRACT

A multi-layer analytics service stack may generate forecasted utilization data. An input layer of the analytics service stack may receive input and designate cloud computing utilization data for analysis. A transformation layer of the analytics service stack may perform format transformations on the cloud computing utilization data, and the data may be prepared for analysis at a data treatment layer of the cloud computing utilization data. The treated and transformed cloud computing utilization data may be analyzed using multiple analytics models by a multi-forecasting layer of analytics service stack to generate the forecasted utilization data.

20 Claims, 10 Drawing Sheets

(56) References Cited

OTHER PUBLICATIONS

Australian Patent Office, Examination Report No. 1 for Australian Patent Application No. 2017264992 dated Apr. 10, 2018, pp. 1-7.
Doyle et al., "Cloud Instance Management and Resource Prediction for Computation-as-a-Service Platforms" IEEE, 2016 IEEE International Conference on Cloud Engineering (IC2E), 2016.
Examination Report No. 2 for Australian Application No. 2017264992, dated Aug. 13, 2018, pp. 1-4.

\* cited by examiner

| Input Files | General | Techniques | Data Preparation | Names | Multicollinearity | AriMax | Missing Values | Outliers |

Choose Techniques You want to Try

All  None

- ETS
- ETS BOX-COX
- ARIMA
- ARIMA BOX-COX
- ARIMA SEASONALITY-DIFF
- ARIMA BOX-COX SEASONALITY-DIFF
- FORECAST
- FORECAST BOX-COX
- MLR
- ARIMAX

[< Back]  [Next]  [Cancel]  [Help]

Figure 6

| Input Files | General | Techniques | Data Preparation | Names | Multicollinearity | AriMax | Missing Values | Outliers |

TRAINING AND TEST DATA PREPARATION

How do you want to split data?

Enter Number of Cycles for preparing Training Data

`1`   ← 702

Training Data %

`80`  ← 704

[ < Back ]  [ Next ]    [ Cancel ]    [ Help ]

| Input Files | General | Techniques | Data Preparation | Names | Multicollinearity | AriMax | Missing Values | Outliers |

MISSING VALUES

How do you want to treat Missing Values?

1002

None
KNN method
Mean Value
Standard Value

1004

Enter the Standard Value that you want replaced with MISSING values

[ < Back ]  [ Next ]   [ Cancel ]   [ Help ]

COMPARATIVE MULTI-FORECASTING ANALYTICS SERVICE STACK FOR CLOUD COMPUTING RESOURCE ALLOCATION

PRIORITY CLAIM

This application claims priority to Indian Patent Application No. 201741013376, filed 14 Apr. 2017, titled Comparative Multi-Forecasting Analytics Service Stack for Cloud Computing Resource Allocation, which is incorporated in its entirety.

TECHNICAL FIELD

This disclosure relates to cloud computing resource allocation and consumption via a multiple layer analytics stack.

BACKGROUND

Rapid advances in communications and storage technologies, driven by immense customer demand, have resulted in widespread adoption of cloud systems for managing large data payloads, distributed computing, and record systems. As one example, modern enterprise systems maintain data records many terabytes in size. Improvements in cloud resource allocation and consumption prediction will further enhance the capabilities of cloud computing systems.

BRIEF DESCRIPTION OF THE DRAWINGS

FIG. 6 shows an example 'Techniques'-tab interface.

FIG. 7 shows an example 'Data Preparation'-tab interface.

FIG. 10 shows an example 'Missing Values'-tab interface.

DETAILED DESCRIPTION

In various cloud computing systems, computing resources such as virtual machines, memory, processor cores, or other computing resources may be allocated by a cloud provisioning server. In some cases, a computing resource allocated by the cloud provisioning server for a first computing project (or entity) may not necessarily be available for a second computing project. This unavailability may persist as long as the computing resource is allocated to the first computing project regardless of the utilization state of the computing resource. In some cases, an idle resource allocated to the first computing project may still be unavailable for reallocation to the second computing project despite its idle utilization state. The techniques and architectures discussed herein may be applied to private cloud provisioning planning and public (e.g., provider-based cloud services) cloud resource allocation.

Accordingly, increased allocation accuracy may solve the technical problem of system inefficiency by increasing utilization of cloud computing resources. The analytics service stack techniques and architectures described below may be used to accurately predict future cloud computing resource utilization at many different levels ranging from individual resource requests, to projects composed of one or more resources, and even across an entire enterprise that has commissioned multiple project, each composed of multiple resources. In addition to increasing cloud computing resource utilization, the analytics service stack techniques and architectures may be used by a cloud computing control system to accurately request cloud computing resource based on predicted usage. Accordingly, projects and enterprises may avoid requisitioning cloud computing resources that go unused, and reclaim or shutdown resources that become dormant to reclaim processing resources, save costs, and increase efficiency. Thus, the analytics service stack techniques and architectures improve the operation of the underlying hardware by increasing computing efficiency and provide an improvement over existing solutions. The analytics service stack may analyze historical utilization data and predict future utilization. Utilization data, may include, for example, historical data related to usage of cloud computing resources, e.g., resource allocation history, processor activity, memory usage history, computing cycles, data throughput, or other utilization metrics.

Figure 1:
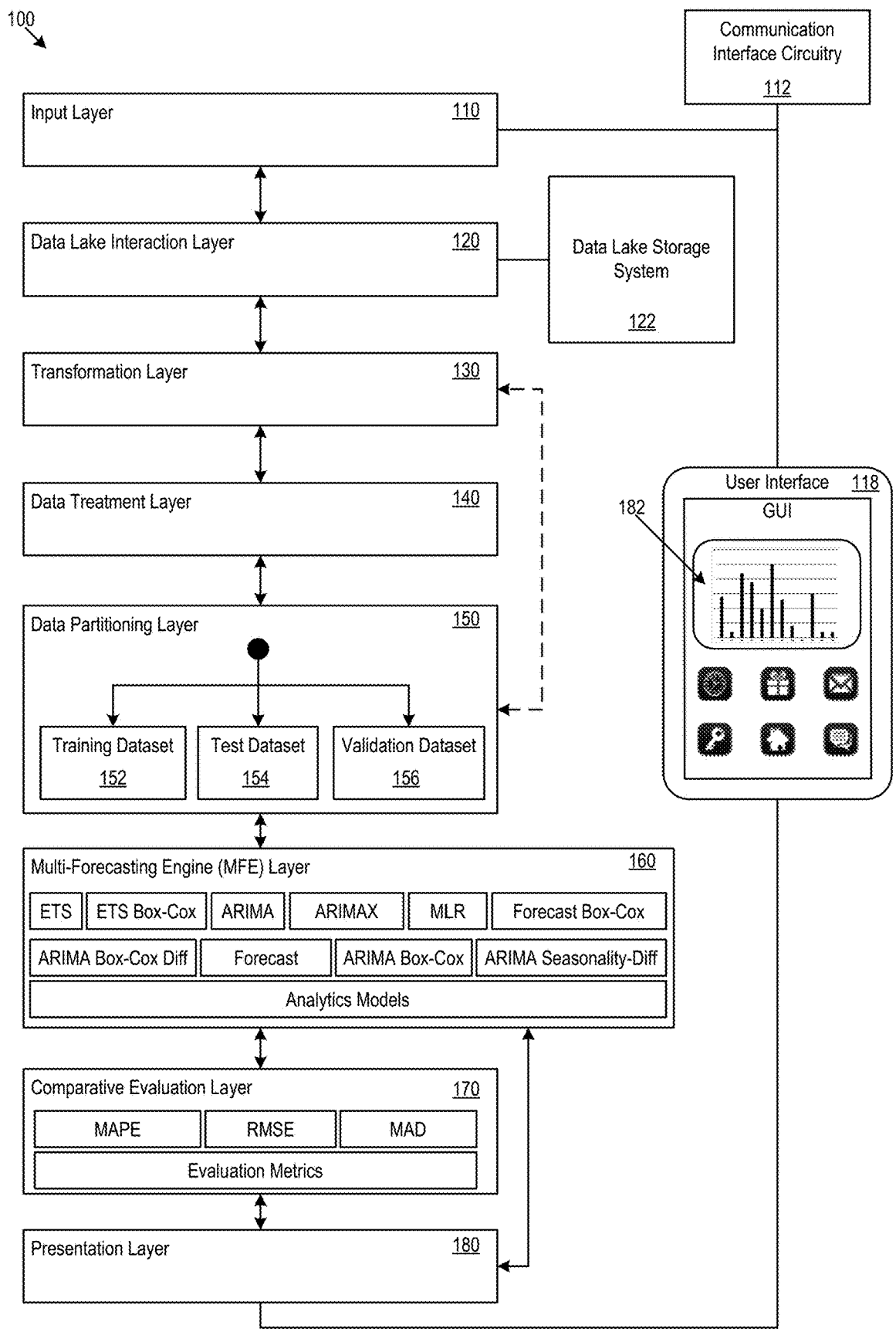
FIG. 1 shows an example multiple layer analytics service stack.

FIG. 1 shows an example multiple layer analytics service stack 100. In this example, the analytics service stack 100 includes an input layer 110, data lake interaction layer 120, a transformation layer 130, a data treatment layer 140, a data partitioning layer 150, a multi-forecasting engine (MFE) layer 160, a comparative evaluation layer 170, and a presentation layer 180. The analytics service stack 100 may include a multiple-layer computing structure of hardware and/or software that may handle predictive analysis through a multi-forecasting (e.g., multiple analytical model) technique.

In some example implementations, the iForesight™ system by Accenture, Bangalore may be operated as the analytics service stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the analytics service stack 100, the data lake interaction layer 120 may provide the transformation layer 130 with access to stored cloud computing utilization data within a data lake. Hence, the data lake interaction layer 120 may provide a hardware resource, e.g., data lake memory access, to the transformation layer 130.

Figure 2:
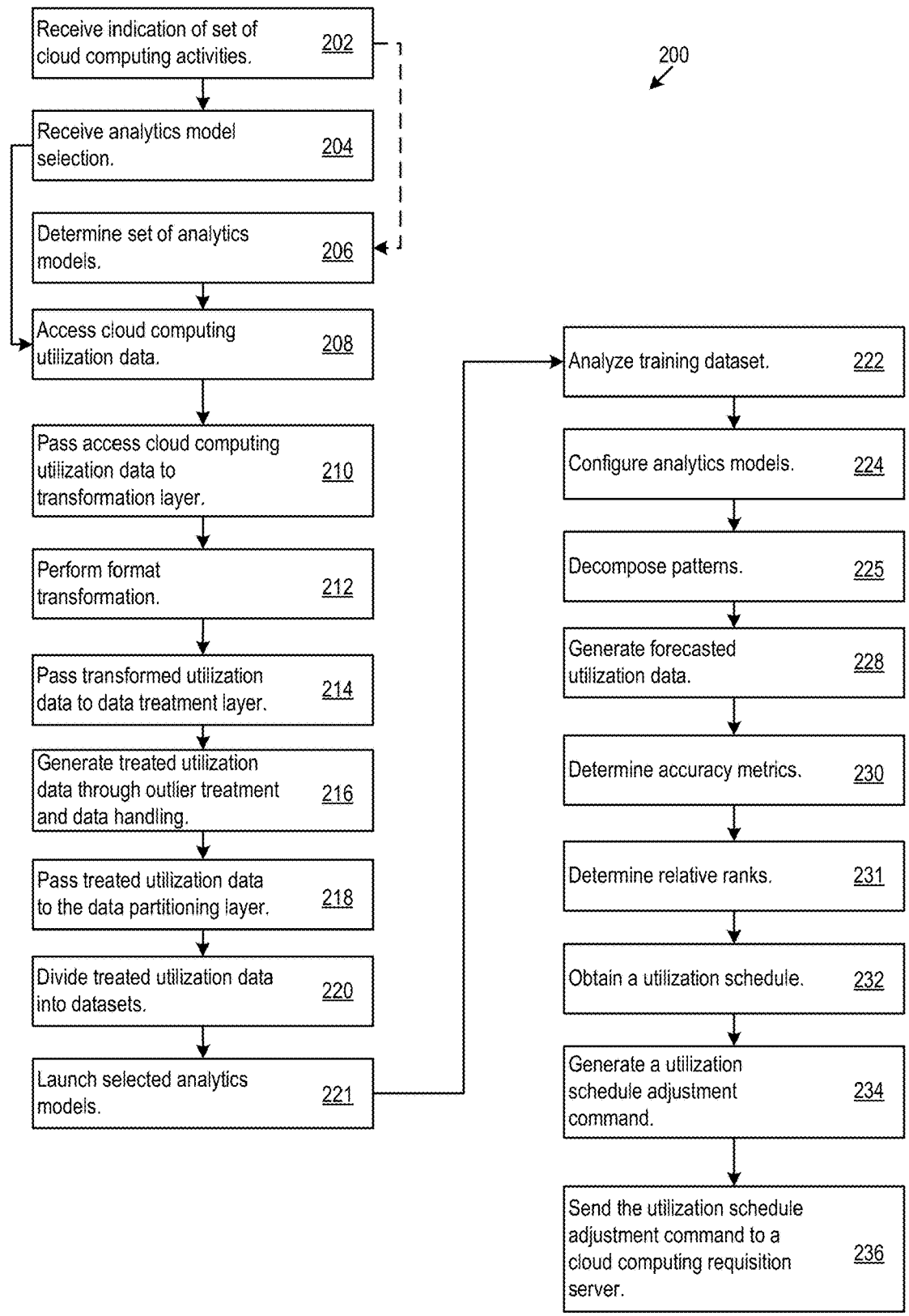
FIG. 2 shows example analytics service stack logic.

In the following, reference is made to FIG. 1 and the corresponding example analytics service stack logic (ASL) 200 in FIG. 2. The logical features of ASL 200 may be implemented in various orders and combinations. For example, in a first implementation, one or more features may be omitted or reordered with respect to a second implementation. At the input layer 110 of the analytics service stack 100, the ASL 200 may receive, e.g., from a communication interface or user interface, an indication of a set of cloud computing activities or projects and associated cloud computing utilization data for monitoring by the analytics service stack 100 (202). At the input layer 110, the ASL 200 may also receive an analytics model selection for analysis of the cloud computing utilization data (204).

The analytics model selection may include a subset of the available analytics models or a selection of all models. In some cases, the ASL 200 may not necessarily receive a model selection. Using the MFE layer 160, the ASL 200 may determine a set of models to run based on the indication received at the input layer (206). The ASL 200 may base the determination on the available models, computing resource availability, model selection history, previous accuracy metric data, or other parameters.

The input layer 110 may include a user interface 118 which renders or displays a graphical interface system, e.g., partitioned into specific detail tabs. Example tab interfaces from an example graphical interface system are shown in FIGS. 4-10 below.

The ASL 200 may access the indicated cloud computing utilization data via the data lake interaction layer 120 of the analytics service stack 100 (208). The data lake interaction layer may have access to network hardware resources, e.g., through communication interface circuitry 112, allowing communication with one or more data lake storage systems 122. Data lake storage systems may include data centers, cloud storage deployments, relational databases, big data repositories, localized storage systems (small or large scale), or other data storage systems. The data lake storage systems may maintain utilization data for various cloud computing projects or enterprises managed by the ASL 200. The data lake interaction layer 120 may also ingest raw cloud billing data, e.g., using Hadoop-based data ingestion tools. The data lake interaction layer 120 may direct the data to be pre-processed to timestamp the data and to aggregate the data at the resource level, e.g., by type of virtual machine or other cloud resource.

The data lake interaction layer 120 may pass the accessed cloud computing utilization data to the transformation layer 130 of the analytics service stack 100 (210). The transformation layer 130 may perform format transformations on the cloud computing utilization data to ready the data, as transformed utilization data, for analysis at the MFE layer 160 (212). The format transformations may include mathematical operations on the data. For example, the mathematical operations may include Z-transforms, other time-to-frequency transforms, log transforms, or other discrete variable transformations. The format transforms may also include file-type or data organization type transforms. For example, the utilization data may be transformed from a common separated value (CSV) format to a columnar format. The transformation layer may also transform encapsulation or encoding types for data streams. In some cases, the transformation layer 130 may add or remove data headers or alter metadata content to facilitate processing at the MFE layer 160.

The transformation layer 130 may pass the transformed utilization data to the data treatment layer 140 (214). The data treatment layer 140 may 'clean-up' the transformed utilization data by generating treated utilization data (216). The data treatment layer may generate the treated utilization data by removing data artifacts that may affect the analyses at the MFE layer 160. For example the artifacts may include missing data values, statistical outliers, contextually invalid data values or other data artifacts.

In some cases, the data treatment layer 140 may replace missing data values with interpolated values determined from other data within the transformed utilization data. In some cases, the data used to interpolate a new data value may include neighboring data from nearby data within a time series or data from similar cloud systems (e.g., similarly configured virtual machine instances on the same project). In other cases, the data treatment layer 140 may correct missing data by removing partial entries. For example, a data entry may include a time value while lacking a utilization value. The data treatment layer 140 may correct the missing utilization value condition by removing the entry or by generating an interpolated value.

Contextually-invalid data may include data values that the data treatment layer determines are invalid through contextual analysis. For example, different types of data may have valid data ranges. For example, some cloud resource utilization metrics may only accept positive and zero values. Accordingly, the data treatment layer 140 may reject negative values as contextually invalid for such cloud resource utilization metrics. In some cases, operation rules (e.g., enterprise operational rules, variable definitions, or other rules) may define acceptable values or patterns. For example, an operational rule may define an accruing cost metric such that value increases and may define a value that decreases with respect to a previous value as invalid.

Once the data treatment layer 140 has generated treated utilization data, the data treatment layer 140 may pass the treated utilization data to the data partitioning layer 150 (218). The data partitioning layer 150 may divide the treated utilization data into one or more datasets to facilitate training, testing, and validation at the MFE layer 160 (220). The dataset may include a training dataset 152, a testing dataset 154, and a validation dataset 156. The data partitioning layer 150 may pass the datasets to the MFE layer 160.

The MFE may launch the one or more selected analytics models (221). The MFE layer 160 may analyze the training dataset 152 for patterns and predictive model parameters for the selected analytics models (222). The MFE layer 160 may configure the selected analytics models based on the patterns and predictive model parameters gleaned from the training dataset 152 (224). In some cases, the MFE layer 160 may decompose patterns in the training dataset into multiple groups (225). For example, the MFE layer 160 may break the patterns up into those that show trends, periodic or seasonal patterns, or random non-patterned groups.

The test dataset 154 may serve as input data for which the MFE layer 160 generates forecasted utilization data. The MFE layer 160 may generate the forecasted utilization data overlapping, e.g., in time, in part with the validation dataset 156 (228). The overlap may be used by the comparative evaluation layer 170 to determine the accuracy of the analytics model after being calibrated using the training dataset. Responsive to the forecasted utilization data, the MFE layer 160 may generate a prescriptive utilization forecast that indicates the cloud computing resource that may be requisitioned to cover the forecasted utilization.

In various implementations, the data partitioning layer 150 may determine to forgo creation of one or more the training, test, or validation datasets 152-156. Forgoing creation of one or more of the datasets (e.g., 152, 154, 156) may leave a larger share of the total data for use in others of the datasets. This may increase the efficiency/accuracy of tasks using one of the remaining datasets. In some cases, forgoing creation of a dataset (e.g., 152, 154, 156) may lead to the MFE layer 160 or the comparative evaluation layer 170 forgoing a corresponding analysis, prediction, calibration, or other task.

After the MFE layer 160 generates forecasted utilization data (either overlapping with validation data or future data), the comparative evaluation layer 170 may determine on or more accuracy metrics for the forecasted utilization data (230).

The accuracy metrics used by the comparative evaluation layer 170 may include, for example, error rates, mean absolute percentage errors (MAPE), median absolute deviations (MAD), root-mean-squared errors (RMSE), or other accuracy metrics. The comparative evaluation layer 170 may determine the accuracy metrics by comparing the forecasted utilization data with validation data (which may be collected prior to generating the forecasted utilization data) or future data collected during the predictive period. The comparative evaluation layer 170 may determine relative ranks of analytics models based on accuracy (231).

The ASL 200 may use the ranking to select models for a predictive period. The predictive period may be selected according to operational rules. Further, the ASL 200 may determine rankings for projects or portions thereof within the predictive period. The ASL 200, using the comparative evaluation layer 170, may select a customized set of analytics models for a project or a portion of the project. For example, a project may use computing resources such as processor cores on a multiple virtual machines. In some implementations, The ASL 200 may select an individual model for groupings of the virtual machines, and in some cases, each individual virtual machine. Accordingly, the ASL 200 may map out a selection of models for granularities of computer resources ranging from consistency across virtual machines of an entire enterprise down to having a customized selection of models for individual virtual machines (or other computational resource whether physical or abstracted).

Further, the predictive period may vary across implementations or dynamically within an implementation. Accordingly, an analytics model may be selected for a particular computing resource for a first predicative period, and the ASL 200 may selected a different analytics model for the same particular resource for a subsequent predictive period. As a result, the ASL 200 may select models at varying time granularities. For example, for a particular computing resource of group of resources, the analytic model may be updated daily (e.g., according to time of day), weekly, monthly, seasonally, annually, aperiodically (e.g., when trigger conditions are met), or over another time interval. Trigger conditions may include changes in average accuracy of an analytics model over time, changes in accuracy of competing (e.g., non-selected models), configuration changes, resource cost changes, or other changes. In some cases, a trigger condition may be met when a change exceeds a magnitude threshold or when a metric changes in relation to an absolute threshold. For example, an operational rule may specify that the analytics model selection should be revaluated if average accuracy changes more than 5%. In another example, an operational rule may specify that the analytics model selection should revaluated if accuracy falls below 80% for a predictive period. In some cases, relative and absolute thresholds may be combined into a single operational rule (e.g., a change of more than 5% or a drop below 80%). In some cases, relative change may trigger reevaluation when the change represents a drop in accuracy. In some cases, the system may meet a trigger condition with changes representing improvements or reductions in accuracy. For example, in some cases, a positive change in accuracy for a selected analytics model may be indicative of larger positive changes in accuracy of competing analytics models. Accordingly, in some implementations, reevaluation of analytics model selection may be appropriate even after a recorded improvement in accuracy for a selected analytics model.

Responsive to the prescriptive utilization forecast, the ASL 200 may obtain a utilization schedule (232). For example, the ASL 200 may generate the utilization schedule by applying operational rules 356 to the prescriptive utilization forecast. The operation rules may include requisition minimums, targets, or maximums; guidelines on resource 'headroom', project priority, cost caps, or other operational rules. Headroom may refer to requisitioned cloud computing resources in excess of expected utilization. In some cases, headroom may be requisitioned to guard against failures when cloud resource demand exceeds predicted expectations.

Additionally or alternatively, the ASL 200 may obtain the utilization schedule by receiving the schedule based on user input. For example, a system user may review the prescriptive utilization forecast, the forecasted utilization data, the accuracy metrics, or other data and determine a utilization schedule.

Based on the generated utilization schedule, the ASL 200 may determine to adjust a current schedule. Accordingly, the ASL 200 may generate a utilization schedule adjustment command (234). The ASL 200 may send the utilization adjustment command to a cloud provisioning server to request cloud computing resources in accord with the utilization schedule (236).

The utilization schedule may be selected by the ASL 200 or the system user such that the utilization schedule will more closely track actual utilization for a period than a current schedule.

As discussed above, the analytic service stack 100 may further include a presentation layer 180. The presentation layer 180 may compile the prescriptive utilization forecast, the forecasted utilization data, the accuracy metrics, or other data into a user interface presentation 182 using the user interface 118. The user interface presentation may support conveyance of the information in the data to the user to inform decisions, such as, which analytics models to implement and what utilization schedules to user.

Figure 3:
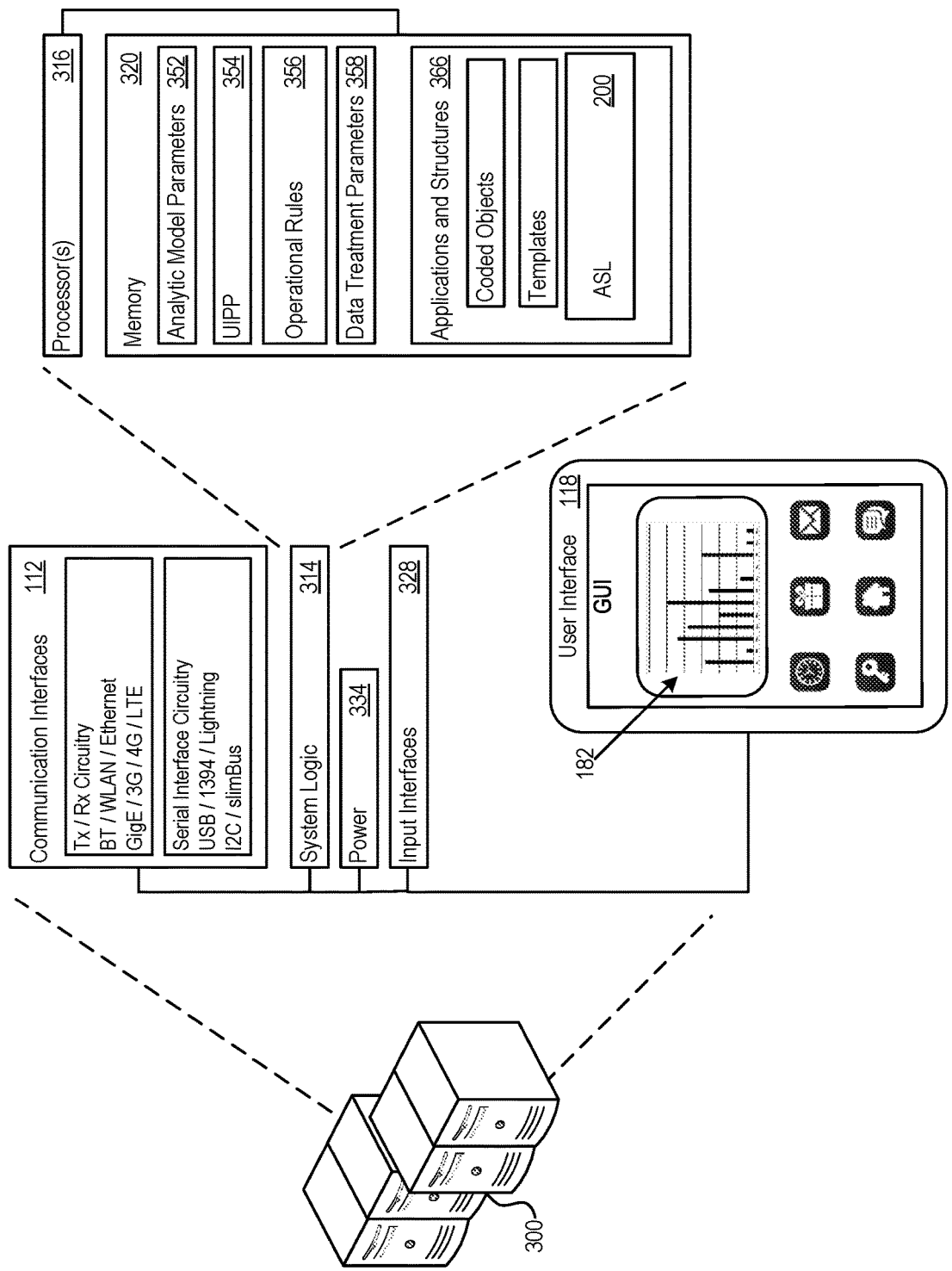
FIG. 3 shows an example specific execution environment for the analytics service stack of FIG. 1.

FIG. 3 shows an example specific execution environment 300 for the analytics service stack 100 described above. The execution environment 300 may include system logic 314 to support execution of the multiple layers of analytics service stack 100 described above. The system logic may include processors 316, memory 320, and/or other circuitry.

The memory 320 may be include analytic model parameters 352, user interface presentation parameters (UIPP) 354, operational rules 356, and data treatment parameters 358. The memory 320 may further include applications and structures 366, for example, coded objects, machine instructions?, templates, or other structures to support analytic model training, forecast data generation, accuracy metric evaluation, or other tasks described above. The applications and structures may implement the ASL 200.

The execution environment 300 may also include communication interfaces 112, which may support wireless, e.g. Bluetooth, Wi-Fi, WLAN, cellular (4G, LTE/A), and/or wired, Ethernet, Gigabit Ethernet, optical networking protocols. The communication interfaces 112 may also include serial interfaces, such as universal serial bus (USB), serial ATA, IEEE 1394, lighting port, $I^2C$, slimBus, or other serial interfaces. The execution environment 300 may include power functions 334 and various input interfaces 328. The execution environment may also include a user interface 118 that may include human-to-machine interface devices and/or graphical user interfaces (GUI). In various implementations, the system logic 314 may be distributed over multiple physical servers and/or be implemented as a virtual machine.

In some cases the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the analytics service stack 100, of the execution environment onto the hardware resources. In some cases, a manifest may be stored as a preference file such as a YAML (yet another mark-up language), Java script object notation (JSON), or other preference file type.

The MFE layer 160 of the analytics service stack 100 may operate multiple selected models in parallel or in series to generate the forecasted utilization data. Different analytics models may tend to perform better on different types of underlying utilization data. For example, some analytics models may be designed to detect and track seasonal variations, while other models may use more open-ended trend modelling mechanisms. In some cases, running multiple models and ranking the models according to accuracy metrics may allow for identification of the analytics models that best forecast utilization for a particular system or project.

Different model types may be classified according to the model's assumptions in identifying trends. The classifications may include, for example: additive analytics models, damped-additive analytics models, multiplicative analytics models, damped-multiplicative analytics models, and non-intermittent analytics models. Table 1 shows the features of additive and multiplicative analytics models.

TABLE 1

Additive and Multiplicative Analytics Models

| Model Type | Description |
| --- | --- |
| Additive | Additive models may assume that the different components affect the time series additively<br>Data = Seasonal effect + Trend + Cyclical + Residual<br>For example, for monthly data, an additive model assumes that the difference between the January and July values is approximately the same each year. In other words, the amplitude of the seasonal effect is the same each year.<br>The model assumes that the residuals are roughly the same size throughout the series, e.g., a random component that adds on to the other components in a consistent way across the series. |
| Multiplicative | Multiplicative analytics models may track trends based on percentage change variations. In some cases, absolute changes in a variable may be less predictive of future behavior than scaled changes.<br>For example, in seasonal data, a multiplicative model may detect that July values maintain a similar proportional relationship to January values in a particular year. By contrast, an additive model may assume the January to July difference could be modeled as a constant.<br>Data = Seasonal effect × Trend × Cyclical × Residual |

Table 2 includes descriptions of example analytics models that may be used by the MFE layer 160.

TABLE 2

Example Analytics Models

| Model Name | Description |
| --- | --- |
| Exponential Smoothening (ETS) | Exponential Smoothening may make forecasts using weighed averages of historical/past values. More recent values may be given greater weight (alpha). Exponential Smoothening may be suitable for forecasting data with no trend or seasonal pattern.<br>Smoothed Value (at time t) = Actual value at time t * alpha + Smoothed Value at the previous time t-1 * (1 - alpha) |
| ETS Box Cox | The Box-Cox transformation of the variable x is also indexed by λ, and is defined using the box-cox formula:<br>$$x'_\lambda = \frac{x^\lambda - 1}{\lambda}.$$<br>λ = 1: (No substantive transformation)<br>λ = 1/2: (Square root plus linear transformation)<br>λ = 0: (Natural logarithm)<br>λ = −1: (Inverse plus 1)<br>Box-Cox transformations may be merged with ETS models. Box-cox transformations may help in balancing the seasonal fluctuations and the random variation across the data/time series. |
| Auto ARIMA | The auto.ARIMA (Auto ARIMA) function in R in uses a variation of the Hyndman and Khandakar algorithm which combines principles such as minimization of AIC (Akaike information criteria) and unit root tests to obtain the best ARIMA model. ARIMA(p, d, q) models may be selected from the following:<br>ARIMA(2, d, 2),<br>ARIMA(0, d, 0),<br>ARIMA(1, d, 0),<br>ARIMA(0, d, 1).<br>Note:<br>1) The number of differences "d" is determined using repeated KPSS tests<br>2) The values of free parameters p and q are then chosen by minimizing the AICs after differencing the data "d" times. Rather than considering every possible combination of p and q, the algorithm uses a stepwise search to traverse the model space. |
| Auto ARIMA with Lambda (ARIMA Box Cox) | Prior to performing the ARIMA modeling a Box-Cox transformation may be applied. Once the Box-Cox transformation is applied, the ARIMA model may be used forecasting.<br>In a seasonal ARIMA model, seasonal AR and MA terms predict utilization(x) at time(t) using data values and errors at times with periodicities that are multiples of S (the span of the seasonality). Seasonality may cause a series to be nonstationary because the average values at particular times within the seasonal span (months, for example) may be different than the average values at other times. If trend is present in the data, we may also need non-seasonal differencing. In some cases, a first difference (non-seasonal) will "de-trend" the data. |
| Auto ARIMA with differencing and box cox transformation (ARIMA BOX-COX SEASONALITY-DIFF) | This is a hybrid approach that uses box cox transformations along with seasonality/differencing. |
| Forecast function | "R" programming environments may also |

TABLE 2-continued

Example Analytics Models

| Model Name | Description |
|---|---|
| with box-cox (FORECAST Box-Cox) | have a "Forecast" package that provides methods and tools for displaying and analyzing univariate time series forecasts including exponential smoothing via state space models and automatic ARIMA modelling. |
| Multiple Linear Regression (MLR) | MLR models may analyze the relationship between a single dependent variable and one or more independent variables. A MLR fitted model may be used to predict future values for a dependent variable. When forecasting, the following assumptions may be used for the errors (e1, . . . , eN)(e1, . . . , eN): the errors have mean zero; the errors are uncorrelated with each other; the errors are uncorrelated with each predictor xj, i This technique (and related techniques like DLS Regression) may be used with short term time series with linear forecast relationships. |
| ARIMAx (ARIMAX) | ARIMAX incorporates autoregressive and moving average Box-Jenkins techniques with the 'explanatory variables' approach. An example ARIMAX model may be expressed as: $Y^* = \beta.X + \phi1Y^*t\text{-}1 + \phi2Y^*t\text{-}2 \ldots \phi pY^*t\text{-}p + \epsilon t + \theta1\epsilon t\text{-}1 + \theta2\epsilon t\text{-}2 + \ldots \theta q\epsilon t\text{-}qY^* = \beta.X + \phi1Yt\text{-}1^* + \phi2Yt\text{-}2^* \ldots \phi pYt\text{-}p^* + \epsilon t + \theta1\epsilon t\text{-}1 + \theta2\epsilon t\text{-}2 + \ldots \theta q\epsilon t\text{-}q$ Where t is the covariate time, $\epsilon$ is a white noise factor; Y is a stationary series; and $\theta q$ are the coefficients in a moving average polynomial. |
| Mean Function (MEANF) | In a MEANF model, the forecasts of all future values are equal to the mean of the historical data. If we let the historical data be denoted by y1, . . . , yTy1, . . . , yT, then we can write the forecasts as $y\hat{}T + h\|T = \bar{y} = (y1 + \ldots + yT)/T.y\hat{}T + h\|T = \bar{y} = (y1 + \ldots + yT)/T$ The notation $y\hat{}T + h\|Ty\hat{}T + h\|T$ is a shorthand for the estimate of yT + hyT + h based on the data y1, . . . , yTy1, . . . , yT. Although we have used time series notation here, this method can also be used for cross-sectional data (when we are predicting a value not included in the data set). Then, the prediction for values not observed is the average of those values that have been observed. |
| Random Walk Forecast (RWF) | In some cases with systems that exhibit irregular growth RWF models may be used. RWF models predict the change that occurs from one period to the next using a random walk function. In each time period, the value of the variable takes an independent random step up or down, a so-called random walk. If up and down movements are equally likely at each intersection, then every possible left-to-right path through the grid is equally likely a priori. Random walks may have: long periods of apparent trends up or down sudden and unpredictable changes in direction The forecasts from a random walk model are equal to the last observation, as future movements are unpredictable, and are equally likely to be up or down. Thus, the random walk model underpins naive forecasts. |
| NAIVE Method | In NAIVE models, forecasts are set to be the value of the last observation. That is, the forecasts for future values are set to be yT, where yT is the last observed value. |
| Croston Method | The Croston method may be suitable where demand appears at random, with many or even most time periods having no demand; and, where demand does occur, the historical data is randomly distributed, independently or almost independently of the demand interval. Such demand patterns are known as "lumpy demand" or intermittent, irregular, random or sporadic demand. |

As discussed above, the data treatment layer 140 may remove outlier data. Table 3 shows example methods for detecting outlier data, which may be used by the data treatment layer 140.

TABLE 3

Example Outlier Treatment Methods

| Model Name | Description |
|---|---|
| Inter Quartile Range | The IQR (Inter Quartile Range) may be used to determine how spread out the "middle" values are. It can also be used to tell when some of the other values are "too far" from the central value. These "too far away" points are called "outliers", because they "lie outside" the range in which we expect them. Steps for IQR outlier detection: 1) Arrange the data in order 2) Calculate the inter quartile range (Third quartile minus first quartile: Q3 − Q1) 3) Compute Q1 − 1.5(IQR) and Q3 + 1.5(IQR) 4) Anything outside the above specified range is an outlier. The quartile method may be used with other statistical quantities, such as standard deviations or other quantities. The factor (e.g., 1.5 above may be adjusted in different models or determined as a training parameter for the model). |
| Median Absolute Deviation (MAD) | In the MAD method, the median of the set comprising the absolute values of the differences between the median and each data point is calculated. Steps for MAD outlier detection: 1) Calculate the Median of the dataset. 2) Calculate the absolute deviations for every observation from the median. 3) Calculate the median for the above calculated data array. This newly calculated median is called MAD. 4) Calculate the absolute deviation from the median of each point in the data array. Outliers may be defined as points with absolute deviations above a predetermined threshold. |

The data treatment layer 140 may also handle missing values. Table 4 shows example missing value treatment methods, which may be used by the data treatment layer.

TABLE 4

Example Missing Value Treatment Methods

| Model Name | Description |
| --- | --- |
| KNN Value | In this method, the missing values of a case/observation are imputed considering a given number of instances that are most similar to the instance of interest. The similarity of two instances is determined using a distance function. The steps followed are as below:<br>1) Divide the data set D into two parts. Let Dm be the set containing the cases in which at least one of the features is missing. The remaining cases will complete feature information form a set called Dc.<br>2) For each vector 'x' in Dm:<br>  a. Divide the instance vector into observed and missing parts as x = [xo; xm].<br>  b. Calculate the distance between the xo and all the instance vectors from the set Dc. Use those features in the instance vectors from the complete set Dc, which are observed in the vector x.<br>  c. Use the K closest instances vectors (K-nearest neighbors) and perform a majority voting estimate of the missing values for categorical attributes. For continuous attributes replace the missing value using the mean value of the attribute in the k-nearest neighborhood. The median may be used instead of the median. |
| Mean Value | The "mean method" replaces missing values with the dataset's mean or mode. |

Figure 4:
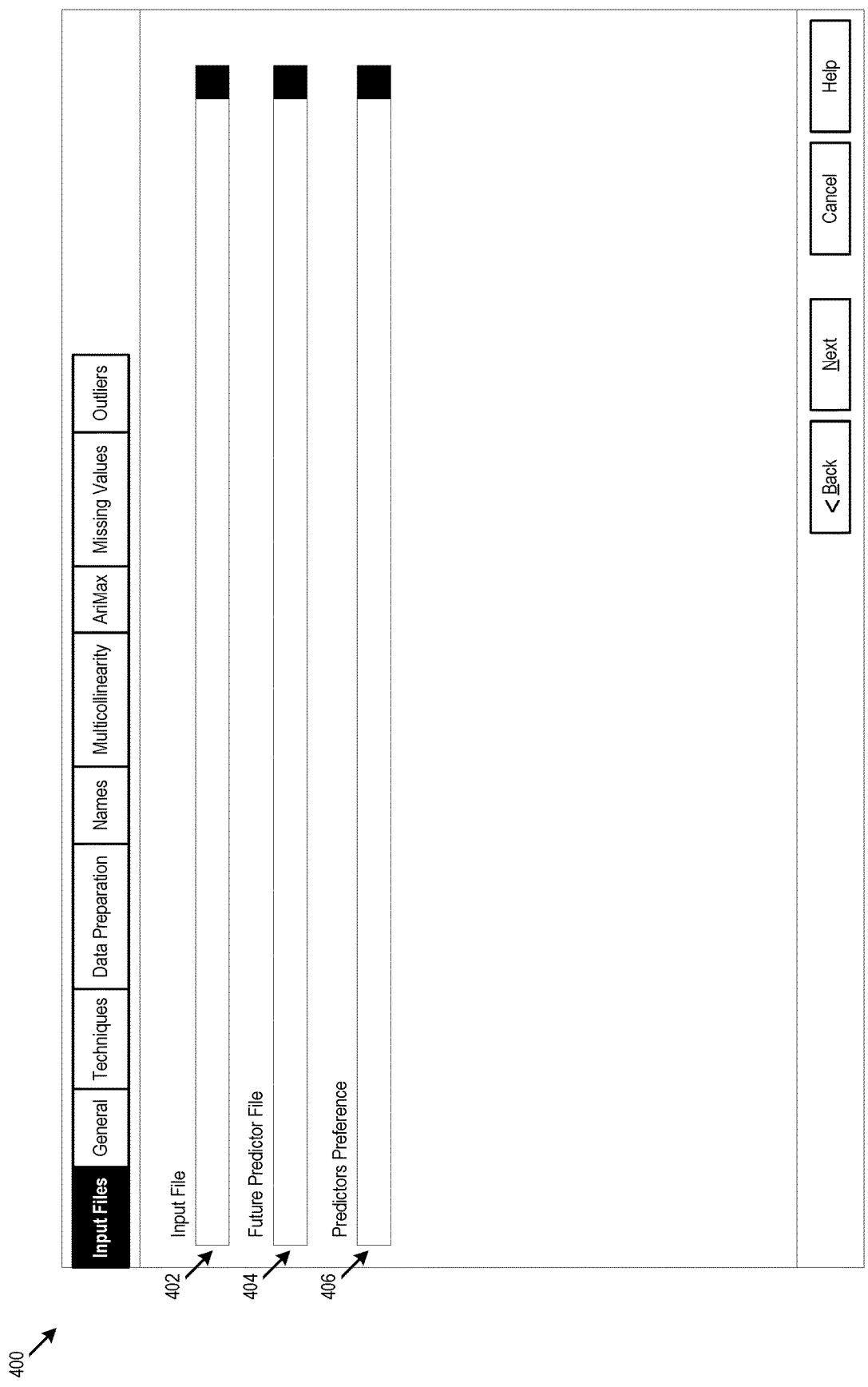
FIG. 4 shows an example 'Input Files'-tab interface.

As discussed above, the input layer 110 may include a tab-based user interface for input of model selections and parameters. FIG. 4 shows an example 'Input Files'-tab interface 400. The 'Input Files'-tab interface 400 includes input 402 and predictor 404 fields used to designate the inputs and storage locations for forecasted data. In addition, the general tab includes a preferred predictor field 406 for selecting preferred analytics models.

Figure 5:
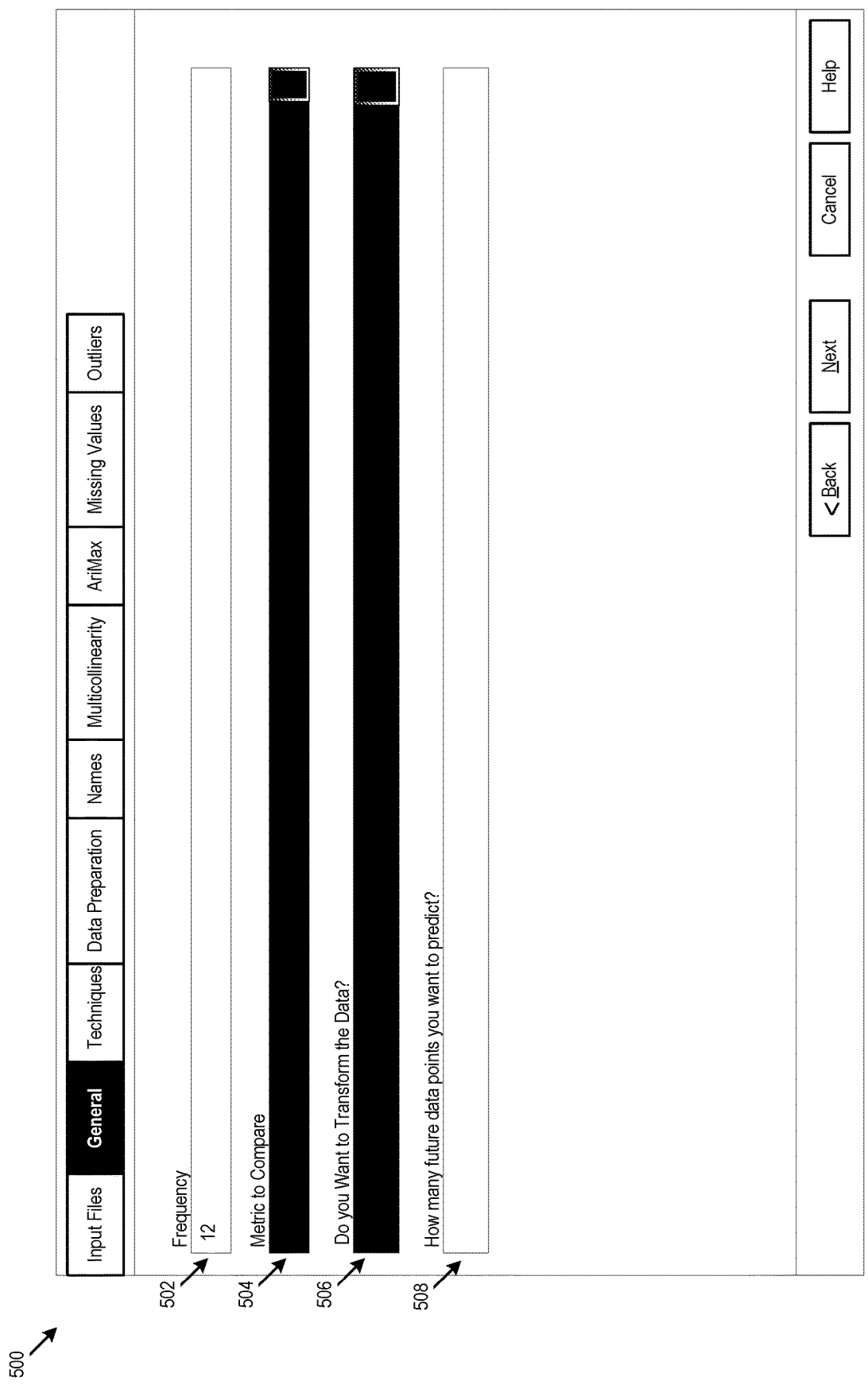
FIG. 5 shows an example "General'-tab interface.

FIG. 5 shows an example 'General'-tab interface 500. The title 'General' indicates that the tab may include options that may affect multiple different models or layers of the analytics service stack. The example 'General'-tab interface 500 includes a frequency field 502 to specify the periodicity of the forecasted utilization data, a metric field 504 to specify the one or more accuracy metrics used by the analytics service stack to evaluate the analytics models, a transformation field 506 to select format transformations to be applied to the cloud utilization data by the transformation layer 130; and a data points field 508 to specify the number of data points to be forecasted.

FIG. 6 shows an example 'Techniques'-tab interface 600. The 'Techniques'-tab interface 600 includes inputs 602 (e.g., binary inputs, fields, or other input) for selection of analytics models for execution by the MFE layer 160.

FIG. 7 shows an example 'Data Preparation'-tab interface 700. The 'Data Preparation'-tab interface 700 allows for selection of parameters for training analytics models. The 'Data Preparation'-tab interface 700 includes a Training Data cycles field 702 for selection of the number of preparation cycles for the training data and a Training Data Allocation field 704 for selection of the portion of the input data to be dedicated to analytics model training.

Figure 8:
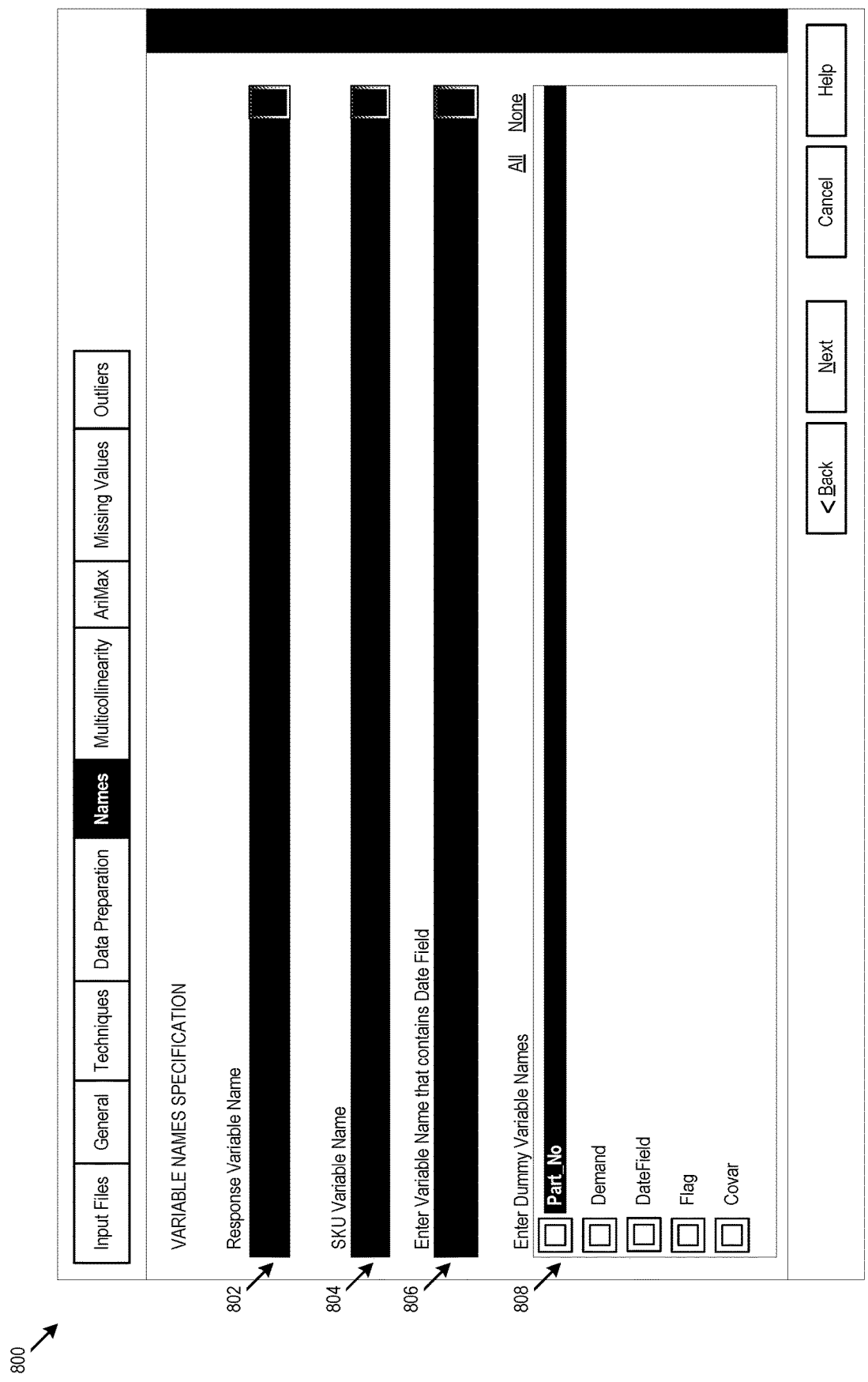
FIG. 8 shows an example 'Names'-tab interface.

FIG. 8 shows an example 'Names'-tab interface 800. The 'Names'-tab interface 800 includes a response variable field 802 to name modeled output variables; Product name field 804 for naming cloud computing resources for which demand in being modeled, and a date identifier field 806 for indicating where date information for dates and timestamps is stored. The 'Names'-tab interface 800 may also include a 'Dummy Variable' selection field 808 to assist in quick and consistent name selection by providing predefined options.

Figure 9:
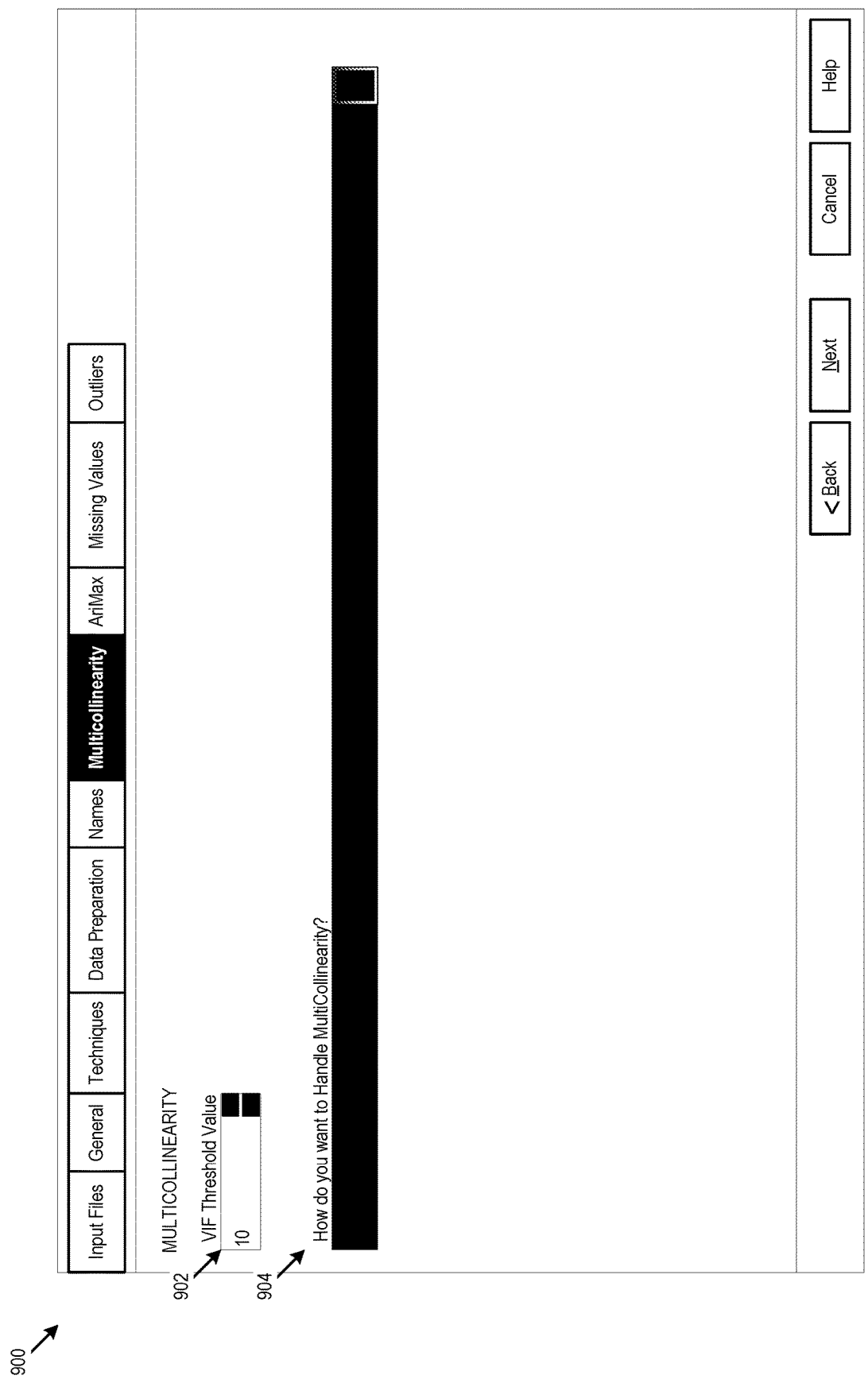
FIG. 9 shows an example 'Multicollinearity'-tab interface.

FIG. 9 shows an example 'Multicollinearity'-tab interface 900. The Multicollinearity'-tab interface 900 may be used (e.g., by an operator) to control how the MFE layer 160 may handle variance inflation. The Multicollinearity'-tab interface 900 includes a variance inflation factor (VIF) threshold field 902 for setting the VIF threshold and a multicollinearity handling field 904 for selecting how the MFE layer 160 may handle multicollinearity.

FIG. 10 shows an example 'Missing Values'-tab interface 1000. The 'Missing Values'-tab interface 1000 may include a missing values treatment field 1002 for selecting the method for treating missing values. The 'Missing Values'-tab interface 1000 may also include a static value entry field 1004 for input of a static value to replace missing values.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above. In an example, a system comprises network interface circuitry configured to: access, via a data lake interaction layer of an analytics service stack, cloud computing utilization data from a data lake storage system; and send a utilization schedule adjustment command to a cloud provisioning server; and processing circuitry in data communication with the network interface circuitry, the processing circuitry configured to: at an input layer of the analytics service stack: receive an indication of the cloud computing utilization data; and an analytics model selection for analysis of the cloud computing utilization data; responsive to the indication, cause the network interface circuitry to access the cloud computing utilization data; receive the cloud computing utilization data at a transformation layer of the analytics service stack; determine a format transformation to prepare the cloud computing utilization data for processing by a multi-forecasting engine layer of the analytics service stack; at the transformation layer, execute the format transformation on the cloud computing utilization data to generate transformed utilization data; pass the transformed utilization data to a data treatment layer of the analytics service stack; at the data treatment layer: generate treated utilization data by: filtering the transformed utilization data in accord with a removal criterion; and supplementing the transformed utilization data in accord with a value insertion criterion; receive the treated utilization data at the multi-forecasting engine layer; responsive to the analytics model selection, determine a selected analytics model to apply to the treated utilization data to generate forecasted utilization data; at the multi-forecasting engine layer, determine a prescriptive utilization forecast responsive to the forecasted utilization data for a prediction period; responsive to the prescriptive utilization forecast, generate a utilization schedule adjustment command; and cause the network interface circuitry to send the utilization schedule adjustment command to the cloud provisioning server to generate an adjusted cloud computing resource allocation for the prediction period.

The example of paragraph [059], where the adjusted cloud computing resource allocation is configured to track the forecasted utilization data more closely than an unadjusted cloud computing resource allocation in force prior to sending the utilization schedule adjustment command to the cloud provisioning server.

The example of paragraph [060], where the adjusted cloud computing resource allocation is configured to result in higher cloud computing resource utilization that the unadjusted cloud computing resource allocation when an accuracy of the forecasted utilization data is greater than a predetermined threshold.

The example of any of paragraphs [059]-[061], where the processing circuitry is configured to send the treated utilization data to a data partitioning layer of the analytics service stack before being the treated utilization data is passed to the multi-forecasting engine layer.

The example of paragraph [062], where the processing circuitry is configured to create, at the data partitioning layer, a training dataset, a test dataset, a validation dataset, or any combination thereof from the treated utilization data.

The example of paragraph [063], where the processing circuitry is configured to determine a model parameter for a selected analytics model from the analytics model selection via analysis of the training dataset.

The example of paragraph [064], where the processing circuitry is configured to: generate the forecasted utilization data responsive to the test dataset; and determine an accuracy metric for the forecasted utilization data by comparing the forecasted utilization data to the validation dataset at a comparative evaluation layer of the analytics service stack.

The example of paragraph [065], where the accuracy metric comprises an error rate, a mean absolute percentage error, a mean absolute deviation, a root-mean-squared error, or any combination thereof.

The example of paragraph [065], where processing circuitry is configured to generate a user interface presentation of the accuracy metric at a presentation layer of the analytics service stack.

The example of any of paragraphs [059]-[067], where the input layer is configured to generate a parameter input interface comprising multiple parameter input tabs.

The example of any of paragraphs [059]-[068], where a selected analytics model from the analytics model selection comprises an autoregressive integrate moving average (ARIMA) Box-Cox seasonality model, an ARIMA Seasonality differential model, an error trend seasonal (ETS) Box-Cox model, a forecast Box-Cox model, or any combination thereof.

The example of any of paragraphs [059]-[069], where the processing circuitry is configured to apply multiple analytics models to the treated utilization data along with a selected analytics model of the analytics model selection.

The example of paragraph [070], where the processing circuitry is configured to generate user interface presentation of multiple accuracy metrics for the multiple analytics models at a presentation layer of the analytics service stack.

In another example, a method comprises: at an input layer of an analytics service stack: receiving an indication of cloud computing utilization data; and receiving an analytics model selection for analysis of the cloud computing utilization data; responsive to the indication, causing network interface circuitry to access the cloud computing utilization data; accessing, via a data lake interaction layer of an analytics service stack, the cloud computing utilization data from a data lake storage system; and receiving the cloud computing utilization data at a transformation layer of the analytics service stack; determining a format transformation to prepare the cloud computing utilization data for processing by a multi-forecasting engine layer of the analytics service stack; at the transformation layer, executing the format transformation on the cloud computing utilization data to generate transformed utilization data; passing the transformed utilization data to a data treatment layer of the analytics service stack; at the data treatment layer: generating treated utilization data by: filtering the transformed utilization data in accord with a removal criterion; and supplementing the transformed utilization data in accord with a value insertion criterion; receiving the treated utilization data at the multi-forecasting engine layer; responsive to the analytics model selection, determine a selected analytics model to apply to the treated utilization data to generate forecasted utilization data; at the multi-forecasting engine layer, determining a prescriptive utilization forecast responsive to the forecasted utilization data for a prediction period; responsive to the prescriptive utilization forecast, generating a utilization schedule adjustment command; and sending, via the network interface circuitry, the utilization schedule adjustment command to a cloud provisioning server to generate an adjusted cloud computing resource allocation for the prediction period.

The example of paragraph [072], where a selected analytics model from the analytics model selection comprises an autoregressive integrate moving average (ARIMA) Box-Cox seasonality model, an ARIMA Seasonality differential model, an error trend seasonal (ETS) Box-Cox model, a forecast Box-Cox model, or any combination thereof.

The example of either of paragraphs [072] or [073], further comprising applying multiple analytics models to the treated utilization data along with a selected analytics model of the analytics model selection.

The example of paragraph [074], further comprising generating user interface presentation of multiple accuracy metrics for the multiple analytics models at a presentation layer of the analytics service stack.

In another example, a system is configured to execute any of the example implementations of any of paragraphs [072]-[075].

In yet another example, a product comprises a machine-readable medium with instructions stored thereon. The instructions are configured to execute any of the example implementations of any of paragraphs [072]-[075].

In another example, a product comprises: a machine-readable medium other than a transitory signal; and instructions stored on the machine-readable medium, the instructions configured to, when executed, cause processing circuitry to: at an input layer of an analytics service stack: receive an indication of cloud computing utilization data; and receive an analytics model selection for analysis of the cloud computing utilization data; responsive to the indication, cause the network interface circuitry to access the cloud computing utilization data; access, via a data lake interaction layer of an analytics service stack, the cloud computing utilization data from a data lake storage system; and receive the cloud computing utilization data at a transformation layer of the analytics service stack; determine a format transformation to prepare the cloud computing utilization data for processing by a multi-forecasting engine layer of the analytics service stack; at the transformation layer, execute the format transformation on the cloud computing utilization data to generate transformed utilization data; pass the transformed utilization data to a data treatment layer of the analytics service stack; at the data treatment layer: generate treated utilization data by: filtering the transformed utilization data in accord with a removal criterion; and supplementing the transformed utilization data in accord with a value insertion criterion; receive the treated utilization data at the multi-forecasting engine layer; responsive to the analytics model selection, determine a selected analytics model to apply to the treated utilization data to generate forecasted utilization data; at the multi-forecasting engine layer, determine a prescriptive utilization forecast responsive to the forecasted utilization data for a prediction period; responsive to the prescriptive utilization forecast, generate a utilization schedule adjustment command; and send, via a network interface circuitry, the utilization schedule adjustment command to a cloud provisioning server to generate an adjusted cloud computing resource allocation for the prediction period.

The example of paragraph [078], where the instructions are further configured to cause the processing circuitry to send the treated utilization data to a data partitioning layer of the analytics service stack before being the treated utilization data is passed to the multi-forecasting engine layer.

The example of paragraph [079], where the instructions are further configured to cause the processing circuitry to create, at the data partitioning layer, a training dataset, a test dataset, a validation dataset, or any combination thereof from the treated utilization data.

Various implementations have been specifically described. However, many other implementations are also possible.

What is claimed is:
1. A system comprising:
  network interface circuitry configured to:
    access, via a data lake interaction layer of an analytics service stack, cloud computing utilization data from a data lake storage system; and
    send a utilization schedule adjustment command to a cloud provisioning server; and
  processing circuitry in data communication with the network interface circuitry, the processing circuitry configured to:
    at an input layer of the analytics service stack:
      receive an indication of the cloud computing utilization data; and
      an analytics model selection for analysis of the cloud computing utilization data;
      responsive to the indication, cause the network interface circuitry to access the cloud computing utilization data;
    receive the cloud computing utilization data at a transformation layer of the analytics service stack;
    determine a format transformation to prepare the cloud computing utilization data for processing by a multi-forecasting engine layer of the analytics service stack;
    at the transformation layer, execute the format transformation on the cloud computing utilization data to generate transformed utilization data;
    pass the transformed utilization data to a data treatment layer of the analytics service stack;
    at the data treatment layer:
      generate treated utilization data by:
        filtering the transformed utilization data in accord with a removal criterion,
        the removal criterion includes a contextually-valid range for the cloud computing utilization data, and
        filtering the transformed utilization data includes removing a contextually-invalid data point located outside the contextually-valid range for the cloud computing utilization data; and
        supplementing the transformed utilization data in accord with a value insertion criterion;
    send the treated utilization data to a data partitioning layer of the analytics service stack;
    create, at the data partitioning layer, a test dataset and a validation dataset from the treated utilization data;
    receive the test dataset at the multi-forecasting engine layer;

responsive to the analytics model selection, determine a selected analytics model to apply to the test dataset to generate forecasted utilization data;

determine an accuracy metric for the forecasted utilization data by comparing the forecasted utilization data to the validation dataset at a comparative evaluation layer of the analytics service stack;

at the multi-forecasting engine layer, determine a prescriptive utilization forecast responsive to the forecasted utilization data for a prediction period;

responsive to the prescriptive utilization forecast, generate a utilization schedule adjustment command; and cause the network interface circuitry to send the utilization schedule adjustment command to the cloud provisioning server to generate an adjusted cloud computing resource allocation for the prediction period.

2. The system of claim 1, where the adjusted cloud computing resource allocation is configured to track the forecasted utilization data more closely than an unadjusted cloud computing resource allocation in force prior to sending the utilization schedule adjustment command to the cloud provisioning server.

3. The system of claim 2, where the adjusted cloud computing resource allocation is configured to result in higher cloud computing resource utilization than the unadjusted cloud computing resource allocation when an accuracy of the forecasted utilization data is greater than a predetermined threshold.

4. The system of claim 1, where the processing circuitry is further configured to create, at the data partitioning layer, a training dataset from the treated utilization data.

5. The system of claim 4, where the processing circuitry is configured to determine a model parameter for a selected analytics model from the analytics model selection via analysis of the training dataset.

6. The system of claim 1, where the accuracy metric comprises an error rate, a mean absolute percentage error, a mean absolute deviation, a root-mean-squared error, or any combination thereof.

7. The system of claim 1, where processing circuitry is configured to generate a user interface presentation of the accuracy metric at a presentation layer of the analytics service stack.

8. The system of claim 1, where the input layer is configured to generate a parameter input interface comprising multiple parameter input tabs.

9. The system of claim 1, where a selected analytics model from the analytics model selection comprises an autoregressive integrate moving average (ARIMA) Box-Cox seasonality model, an ARIMA Seasonality differential model, an error trend seasonal (ETS) Box-Cox model, a forecast Box-Cox model, or any combination thereof.

10. The system of claim 1, where the processing circuitry is configured to apply multiple analytics models to the treated utilization data along with a selected analytics model of the analytics model selection.

11. The system of claim 10, where the processing circuitry is configured to generate user interface presentation of multiple accuracy metrics for the multiple analytics models at a presentation layer of the analytics service stack.

12. A method comprising:

at an input layer of an analytics service stack:
receiving an indication of cloud computing utilization data; and
receiving an analytics model selection for analysis of the cloud computing utilization data;
responsive to the indication, causing network interface circuitry to access the cloud computing utilization data;

accessing, via a data lake interaction layer of an analytics service stack, the cloud computing utilization data from a data lake storage system; and receiving the cloud computing utilization data at a transformation layer of the analytics service stack;

determining a format transformation to prepare the cloud computing utilization data for processing by a multi-forecasting engine layer of the analytics service stack;

at the transformation layer, executing the format transformation on the cloud computing utilization data to generate transformed utilization data;

passing the transformed utilization data to a data treatment layer of the analytics service stack;

at the data treatment layer:
generating treated utilization data by:
filtering the transformed utilization data in accord with a removal criterion,
the removal criterion includes a contextually-valid range for the cloud computing utilization data, and
filtering the transformed utilization data includes removing a contextually-invalid data point located outside the contextually-valid range for the cloud computing utilization data; and
supplementing the transformed utilization data in accord with a value insertion criterion;

sending the treated utilization data to a data partitioning layer of the analytics service stack;

creating, at the data partitioning layer: a test dataset and a validation dataset from the treated utilization data;

receiving the test dataset at the multi-forecasting engine layer;

responsive to the analytics model selection, determine a selected analytics model to apply to the test dataset to generate forecasted utilization data;

determining an accuracy metric for the forecasted utilization data by comparing the forecasted utilization data to the validation dataset at a comparative evaluation layer of the analytics service stack;

at the multi-forecasting engine layer, determining a prescriptive utilization forecast responsive to the forecasted utilization data for a prediction period;

responsive to the prescriptive utilization forecast, generating a utilization schedule adjustment command; and sending, via the network interface circuitry, the utilization schedule adjustment command to a cloud provisioning server to generate an adjusted cloud computing resource allocation for the prediction period.

13. The method of claim 12, where a selected analytics model from the analytics model selection comprises an autoregressive integrate moving average (ARIMA) Box-Cox seasonality model, an ARIMA Seasonality differential model, an error trend seasonal (ETS) Box-Cox model, a forecast Box-Cox model, or any combination thereof.

14. The method of claim 12, further comprising applying multiple analytics models to the treated utilization data along with a selected analytics model of the analytics model selection.

15. The method of claim 14, further comprising generating user interface presentation of multiple accuracy metrics for the multiple analytics models at a presentation layer of the analytics service stack.

16. A product comprising:
a machine-readable medium other than a transitory signal; and
instructions stored on the machine-readable medium, the instructions configured to, when executed, cause processing circuitry to:
at an input layer of an analytics service stack:
receive an indication of cloud computing utilization data; and
receive an analytics model selection for analysis of the cloud computing utilization data;
responsive to the indication, cause the network interface circuitry to access the cloud computing utilization data;
access, via a data lake interaction layer of an analytics service stack, the cloud computing utilization data from a data lake storage system; and
receive the cloud computing utilization data at a transformation layer of the analytics service stack;
determine a format transformation to prepare the cloud computing utilization data for processing by a multi-forecasting engine layer of the analytics service stack;
at the transformation layer, execute the format transformation on the cloud computing utilization data to generate transformed utilization data;
pass the transformed utilization data to a data treatment layer of the analytics service stack;
at the data treatment layer:
generate treated utilization data by:
filtering the transformed utilization data in accord with a removal criterion,
the removal criterion includes a contextually-valid range for the cloud computing utilization data, and
filtering the transformed utilization data includes removing a contextually-invalid data point located outside the contextually-valid range for the cloud computing utilization data; and
supplementing the transformed utilization data in accord with a value insertion criterion;
send the treated utilization data to a data partitioning layer of the analytics service stack;
create, at the data partitioning layer; a test dataset and a validation dataset from the treated utilization data;
receive the test dataset at the multi-forecasting engine layer;
responsive to the analytics model selection, determine a selected analytics model to apply to the test dataset to generate forecasted utilization data;
determine an accuracy metric for the forecasted utilization data by comparing the forecasted utilization data to the validation dataset at a comparative evaluation layer of the analytics service stack;
at the multi-forecasting engine layer, determine a prescriptive utilization forecast responsive to the forecasted utilization data for a prediction period;
responsive to the prescriptive utilization forecast, generate a utilization schedule adjustment command; and
send, via a network interface circuitry, the utilization schedule adjustment command to a cloud provisioning server to generate an adjusted cloud computing resource allocation for the prediction period.

17. The product of claim 16, where the instructions are further configured to further cause the processing circuitry to:
create, at the data partitioning layer, a training dataset from the treated utilization data; and
determine a model parameter for a selected analytics model from the analytics model selection via analysis of the training dataset.

18. The product of claim 16, where a selected analytics model from the analytics model selection comprises an autoregressive integrate moving average (ARIMA) Box-Cox seasonality model, an ARIMA Seasonality differential model, an error trend seasonal (ETS) Box-Cox model, a forecast Box-Cox model, or any combination thereof.

19. The product of claim 16, where instructions are further configured to cause the processing circuitry to apply multiple analytics models to the treated utilization data along with a selected analytics model of the analytics model selection.

20. The product of claim 19, where instructions are further configured to cause the processing circuitry to generate user interface presentation of multiple accuracy metrics for the multiple analytics models at a presentation layer of the analytics service stack.

* * * * *